United States Patent [19]

Imanaga

[11] Patent Number: 4,889,315
[45] Date of Patent: Dec. 26, 1989

[54] ELECTRICALLY OPENING AND CLOSING FAUCET DEVICE

[76] Inventor: Eisuke Imanaga, 4-19, Setagaya 1-chome, Setagaya-ku, Tokyo, Japan

[21] Appl. No.: 276,983

[22] Filed: Nov. 28, 1988

[30] Foreign Application Priority Data

Nov. 30, 1987 [JP] Japan .................. 62-301873

[51] Int. Cl.$^4$ ............... F16K 31/05; F16K 51/00; E03C 1/05
[52] U.S. Cl. ................. 251/129.03; 4/623; 74/421 A; 74/625; 137/801; 251/129.11; 251/249.5
[58] Field of Search ............... 74/89, 14, 421 A, 625; 4/304, 305, 623; 137/606, 607, 801; 251/129.03, 129.04, 129.11, 249.5; 222/63; 250/321, 341; 307/117; 367/93

[56] References Cited

U.S. PATENT DOCUMENTS

| 1,990,090 | 2/1935 | Packard | 251/249.5 |
| 3,010,340 | 11/1961 | Smith | 251/129.03 |
| 3,505,692 | 4/1970 | Forbes | 4/623 |
| 3,639,920 | 2/1972 | Griffin et al. | 4/623 |
| 4,141,383 | 2/1979 | Geimer | 251/129.03 |
| 4,402,095 | 9/1983 | Pepper | 4/623 |
| 4,520,516 | 6/1985 | Parsons | 251/129.03 |
| 4,604,764 | 8/1986 | Enzo | 4/623 |
| 4,681,141 | 7/1987 | Wang | 251/129.03 |
| 4,709,728 | 12/1987 | Ying-Chung | 4/623 |
| 4,722,372 | 2/1988 | Hoffman et al. | 137/562 |

FOREIGN PATENT DOCUMENTS

| 2533527 | 1/1977 | Fed. Rep. of Germany . |
| 1226370 | 7/1960 | France . |
| 1413041 | 8/1965 | France . |

Primary Examiner—George L. Walton
Attorney, Agent, or Firm—Kanesaka and Takeuchi

[57] ABSTRACT

An electrically opening and closing faucet device arranged to be opened and closed by rotation of a spindle thereof. The electrically opening and closing faucet device comprises, a follower gear secured to the spindle, and a motor gear secured to an output shaft of a motor. The motor gear is structured to be moved in synchronization with the follower gear, and the faucet is opened and closed by the rotation of the motor.

3 Claims, 1 Drawing Sheet

ELECTRICALLY OPENING AND CLOSING FAUCET DEVICE

BACKGROUND OF THE INVENTION

1. Field of the Invention

The present invention relates to an electrically opening and closing faucet devices, and more particularly, to an electrically opening and closing faucet devices installed in such a manner that a handle of the faucet is removed and capable of opening and closing a valve thereof by the revolution of a motor.

2. Prior Art

Hitherto, faucets are arranged to discharge water by manually rotating a handle upward projected from the faucet and thereby opening and closing a valve in the faucet, this opening and closing of the faucet causing water discharge.

In the conventional faucets of the type described above, although various shaped types are disclosed depending upon the shape of the handle and that of the body, it is commonly employed that the handle upwards projected from the faucet is manually rotated so that the valve is opened and closed.

Hitherto, in the widely used faucets, the handle thereof needs to be manually rotated for the purpose of discharging water. Therefore, the handle can be contaminated in particular in the case where the user's hand is dirty, causing uncleanliness.

Therefore, faucets of the type in which a sensor or the like is used so that water is discharged by the switch automatically switched on when the hand of the user is held out. Furthermore, another type of faucets of the type with which water is discharged by applying the foot of the user to a footstep thereof were disclosed.

In the faucets of the type described above in which the valve thereof is arranged to be opened and closed by the detection performed by a sensor thereof or turning on of the footswitch, an electric valve is used to open/close the valve thereof so that the electric switch is opened and closed by switching on and off of the switch.

As described above, in the faucets of the type that the handle thereof is manually rotated, the handle needs to be rotated in a rather complicated manner. Furthermore, if the hand of a user is contaminated, the handle is necessarily contaminated, causing incleanliness.

PROBLEMS TO BE SOLVED BY THE INVENTION

In the above described type of faucets that the handle thereof is manually rotated, the handle needs a complicated operation. Furthermore, if the hand of a user is contaminated, the handle is also contaminated, causing uncleanness.

Furthermore, in the faucet devices which have been conventionally disclosed and the valve of which is automated, the valve thereof is opened and closed by an electromagnetic solenoid. Therefore, only the state in which the valve is fully opened and the state in which the same is fully closed can be chosen. It leads to a fact that water is excessively discharged or the flow rate is insufficient. Therefore, they involves a difficulty at the time of us of them.

Furthermore, in the faucet devices of the conventional type in which opening and closing the valve thereof is automated, the structure of the overall body of the faucet device needs to be changed, as a result of which, the same cannot be applied to the faucets widely used in families.

To this end, an object of the present invention is to provide a faucet device installed to the faucet which are generally used in families, and capable of realizing automation for the purpose of improvement in the viewpoint of easy handling, and furthermore capable of, in addition, realizing a state which is the intermediate state between the fully opened state and the fully closed state for the purpose of water of the most proper amount can be caused to flow. As a result of this, water source can be saved.

SUMMARY OF THE INVENTION

In order to achieve the above-described objects, a faucet opened and closed by the rotation of a spindle thereof is characterized in that a follower gear is secured to the spindle and a motor gear secured to an output shaft of a motor is formed in such a manner that this motor gear can follow the abovedescribed follower gear so that the faucet is opened and closed by th rotation of the motor.

Although, the present invention is formed, similarly to the faucet generally used, in such a manner that the valve thereof is opened and closed by the rotation of a spindle thereof, the rotation of this spindle can be performed by a motor with a gear.

Therefore, by giving a forward rotation to the motor, the valve is opened so that water is discharged, while by giving a reverse directional rotation to the motor, the valve can be closed.

Furthermore, in this state, by properly selecting the rotational speed of the motor, the degree of opening of the motor can be determined, as a result of which, the water flow rate can be adjusted in accordance with the degree of the opening.

In this state, only by controlling the rotation of the motor by a manual switch, water can be discharged only by switching on the switch.

Furthermore, when the rotation of the motor is arranged to be reversed by first switching on of the switch and the next switching on the switch performed by one switch provided, only one manual switch needs to be provided for closing the faucet.

On the other hand, the rotational direction of the motor is arranged to be reversed by switching on of either of the switches and also switching on of another switch, the flow rate of water can be, at needs, conducted by a plurality of switching on of the switches which open the valve.

In addition, when the control of the rotation of the motor is arranged to be performed by a sensor which detects the approach of the hand of a user, it is salbrious since the user does not needs to touch the switch.

Furthermore, by way of providing a device for detecting a predetermined amount of water and controlling the rotation of the motor using the detection signal supplied from this detecting device, it can be performed that the valve is closed when a fact that water in, for example, a bathtub reaches a predetermined level is detected by the detecting device.

BRIEF DESCRIPTION OF THE DRAWINGS

The accompanying drawings illustrate an embodiment of the present invention, wherein.

DESCRIPTION OF THE PREFERRED EMBODIMENTS

Figure 1:
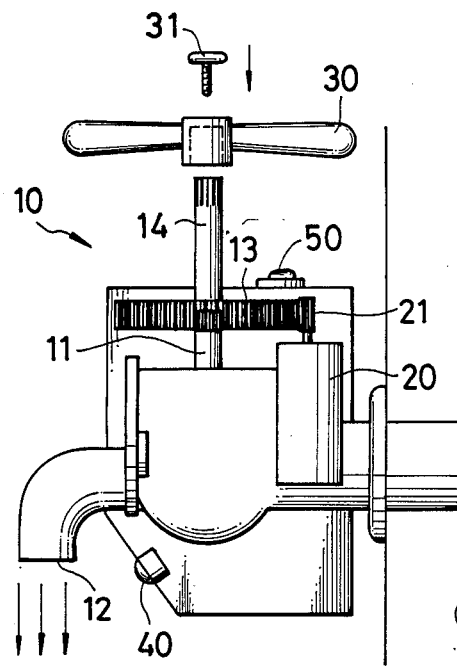
FIG. 1 is a schematic side elevational view.

An embodiment of the present invention will now be described with reference to the accompanying drawings.

Although in the illustrated embodiment, a spindle 11 of a faucet 10 is formed in such a manner that the same can be rotated by the rotation of a motor 20, this faucet can be opened and closed by the direct manual operation of a handle 30. As means for rotating the motor 20, a sensor 40 for detecting approach of a human's hand or the like and a manual switch 50 are additionally provided.

Figure 2:
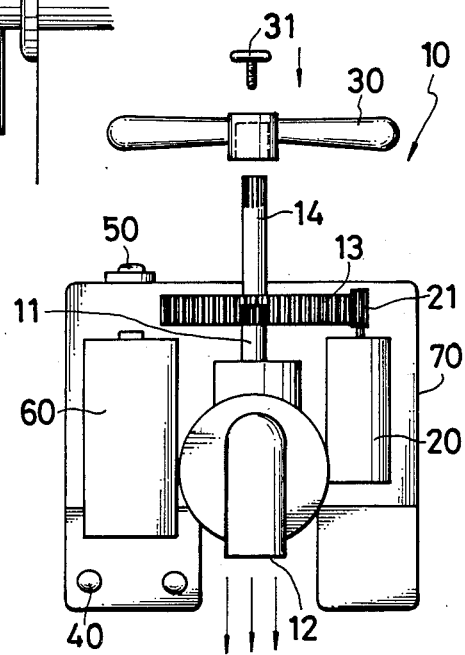
FIG. 2 is a front elevational schematic view.

FIG. 1 is a side elevational schematic view of the abovedescribed embodiment, while FIG. 2 is a front elevational schematic view of the same.

This embodiment is structured in such a manner that, in the faucet 10 of a type used in a usual family from which water is discharged from a nozzle 12 by rotating the handle 30, a handle stopper 31 for securing the handle 30 to the spindle 11 is removed and with this removal of the handle 30, it can be installed from above to the spindle 11.

When this device is installed from the above, a follower gear 13 is secured to the spindle 11 at the central portion thereof and the same is pivoted in such a manner that it can be rotated. Furthermore, a motor gear 21 to be directly engaged with this follower gear 13 is secured to an output shaft of the motor 20. In addition, the above-described follower gear 13, the motor gear 21 and the motor 20 are, together with a battery, accommodated.

From the above-described follower gear 13, a shaft 14 is projected upwards and coaxially with this spindle 11. A handle 30 is secured at the position above this shaft 14 with a handle stopper 31.

Therefore, according to this embodiment, similarly to the conventional faucet 10, by rotating the handle 30, the spindle with the shaft 14 rotates and water can be discharged. Furthermore, the spindle 11 may be rotated with the motor gear 21 and the follower gear 13. As a result of this, an opening and closing valve (omitted from illustration) provided in the faucet 10 is opened and closed so that water is discharged.

As means for rotating this motor 20, means of detecting approach of a human's hand or the like by using a sensor 40 and means of switching on a switch 50 provided on the case 70 are provided.

A handling and operation of the device for electrically opening and closing a faucet according to this embodiment will be described.

This device for electrically opening and closing a faucet is so constituted in such a manner that a valve (omitted from illustration) in the faucet 10 is opened and closed by, similarly to the conventional faucet 10, rotating the handle 30.

By rotating the handle 30 in this time, the rotational force is successively transmitted to the shaft 14, the follower gear 13 and the spindle 11 so that the valve is opened and closed by the rotation of the spindle 11. By opening and closing of the valve of the type described above, a predetermined quantity of water is caused to be discharged from a nozzle 12.

By forming the structure in such a manner that the handle 30 can be secured, this structure can be smoothly used in the conventional faucet devices. Furthermore, even if in a case where the motor 20 cannot be operated, the faucet 10 can be used by rotating the handle 30.

Next, as for the opening and closing of the faucet device by using the motor 20, an operation by using the sensor 40 will be described.

In this state, when a user's hand is approached to this electric faucet opening and closing device, the infrared ray or the like from this hand is detected by the sensor 40 so that the detection of a hand is performed by the sensor 40.

In response to the detection of the hand from this sensor 40, the motor 20 rotates at a predetermined degree. In this state, the direction of rotation of this motor 20 is that it opens for a valve (omitted from illustration) of the faucet 10 Therefore, by such rotation of the motor 20, the valve is opened s that water is discharged from the nozzle 12 of the faucet 10.

Once the sensor 40 detects the approach of the human's hand, the state realized is maintained until the detection of a fact that the hand has been moved away.

That is, during detection of the hand approached, the motor 20 cannot be rotated reversely, so that the state where water is discharged is maintained.

When the approach of the hand becomes impossible to be detected by the sensor 40, that is, when the hand is moved away from the faucet 10, this fact is detected by the sensor, so that the motor 20 is rotated in the reversed direction to that in the above-described case. By the reversed directional rotation of the motor 20, the valve in the faucet 10 is closed. As a result of this, water discharging from the nozzle 12 is caused to be stopped.

When the valve is intended to be opened, the description is made that the motor 20 is rotated by a predetermined degree. On the other hand, when the valve is intended to be closed, the valve may be reversely rotated by a predetermined degree similarly to the case where the same is opened. Another way available can be that the rotation is stopped by the overload of the motor 20 due to the full closing of the valve as an alternative to previously determining the degree of rotation.

In this state, the amount of water to be discharged from the nozzle 12 in response to the detection of the sensor 40 is determined by the degree of rotation of the motor 20. Therefore, by constituting the structure in such a manner that the amount of the rotation of the motor 20 can be previously adjusted, a predetermined quantity of water for a predetermined unit of time period can be discharged from the nozzle 12.

By constituting the structure in such a manner that water is discharged from the nozzle of the faucet 10 by detecting the approach of the hand by the sensor 40, it leads a fact that water cannot be discharged through a hose secured (omitted from illustration) to the nozzle 12. Therefore, in a case where water is discharged by the above-described sensor 40, a handle 30 is preferably provided in addition to this sensor 40.

In this embodiment illustrated, the case is described in which the sensor 40 is disposed in the portion where it can detect the approach of the hand. With this structure, it is convenient to use in washstands or the like, however, if the same is used in a sink or the like, water can be discharged only by moving tableware in the sink.

Therefore, in this case, it is preferable to provide the sensor 40 in the position where the same cannot perform detection when tableware is moved into a sink so that water is discharged by approaching hand to this sensor 40, causing for the valve to be opened, and in addition the valve is closed by again approaching the hand to this sensor 40.

Next, as for opening and closing the faucet device using this motor 20, an operation in a case where the manual switch is switched on will be described.

In this case, the switch 50 is first pushed on. Then, the motor 20 which has detected the switched on of this switch 50 is rotated in the direction causing the valve of the faucet 10 to open.

In this state, water is caused to be continuously discharged from the nozzle 12. When thus-discharging water is intended to be stopped, water discharge from the nozzle 12 can be stopped by again pushing this switch 50 so as to reversely rotate the motor 20, causing the valve of the faucet to be closed.

When the manual switch 50 of the type described above is used, for example, two switches 50 may be provided in such a manner that one of them is arranged to be a switch 50 to open the valve, while another one is arranged to be a switch 50 to close the valve.

If the structure is constituted in such a manner that when the switch 50 to open the valve is once pushed the motor 20 is rotated in the direction opening the valve by a predetermined degree, and the motor is further rotated so as to make the amount of discharge of water twice as much as the above described amount of water when the same switch 50 is further pushed again. That is, if the structure is constituted in such a manner that when the switch 50 to open the valve is pushed once the spindle rotates by 30 degrees, and when the same is pushed twice, the spindle rotates additionally by 30 degrees, that is, the same is rotated by 60 degrees in total, so that the amount of water to be discharged can be freely determined.

Furthermore, in the case where the thus-opened valve is closed, the switch 50 to close the valve 50 is pushed. As a result, the motor 20 is reversely rotated by the complete closing of the valve so that the rotation of the motor 30 is stopped by the load due to the complete closing of the valve. Therefore, discharge of water can be stopped.

In this state, if the structure is constituted in such a manner that a load exceeding a predetermined level applied to the motor 20 can be detected depending upon a judge that the valve has been completely closed, the valve can be completely closed only with one operation.

If the structure is constituted in such a manner that the valve can be opened and closed by the operation of the switch 50, it can be realized, that, for example, water can be introduced and discharged to other portion by connecting a hose to the nozzle under the condition that the valve is opened by the switch 50 to discharge water for a predetermined quantity for a unit time period.

Furthermore, although in the illustrated embodiment, the case is disclosed in which the switch 50 is provided to the case 70, the same may comprise a footswitch 50 or the like.

In the above description, although as the means for rotating the motor 20, the manual pushing type of switch 50 and the sensor 40 are used, the structure may be constituted in such a manner that the motor can be rotated forward and reversely by other means.

For example, although detail illustration is omitted, the structure may be constituted in such a manner that a device for detecting a predetermined quantity of water flow is provided and the detection signal supplied from this detecting device is used to control the rotation of the motor 20. As a result of such structure, when the detection device detects a fact that water in a bathtub reaches a predetermined quantity, the valve is closed so as to prevent overflow of water supplied to this bathtub.

Furthermore, means other than the described means can be employed for decelerating the motor 20. Furthermore, an individually manufactured projection or the like can be provided as an alter native to the handle 30. Furthermore, the rotational force can be transmitted by providing an intermediate body between the spindle 11 and the follower gear 13 at needs.

EFFECT OF THE INVENTION

As described above, according to the present invention, by installing the device according to the present invention to a faucet generally used in a family, a faucet device with which automation can be easily realized can be provided. Therefore, an easy handling can be realized, and an intermediate state between the fully opened state and the fully closed state can be realized so that the quantity of water which can be most easily used can be allowed to be discharged. Consequently, water source can be saved.

What is claimed is:

1. An electrically opening and closing faucet device having a valve, a spindle for rotating the valve and a handle attached to the spindle, comprising:

a follower gear securely attached to the spindle;

a shaft attached to the spindle, said handle being connected to the shaft so that the spindle can be manually turned to open and close the valve by rotating the shaft;

an electric motor having a motor gear, said motor gear engaging the follower gear so that when the electric motor is rotated, the spindle is turned to open and close the valve, a sensor electrically connected to the electric motor, said sensor being situated adjacent to the valve so that only when a hand is detected by the sensor, the electric motor is actuated to turn on the valve for releasing water from the valve, and switch means electrically connected to the electric motor, said switch means having a first switch for operating the electric motor to open the valve and a second switch for operating the electric motor to close the valve, said electric motor being actuated by the sensor and the switch means.

2. An electrically opening and closing faucet device according to claim 1, wherein said electric motor is arranged to rotate a predetermined number once the first switch is actuated so that an amount of opening of the valve is determined by the number of the operation of the first switch, said electric motor being operated to completely close the valve once the second switch is actuated.

3. An electrically opening and closing faucet device according to claim 2, further comprising a battery for operating the electric motor.

* * * * *